United States Patent
Smith

(10) Patent No.: US 11,150,195 B2
(45) Date of Patent: Oct. 19, 2021

(54) SAMPLE SURFACE POLARIZATION MODIFICATION IN INTERFEROMETRIC DEFECT INSPECTION

(71) Applicant: Onto Innovation inc., Wilmington, MA (US)

(72) Inventor: Nigel P. Smith, Beaverton, OR (US)

(73) Assignee: Onto Innovation Inc., Wilmington, MA (US)

( * ) Notice: Subject to any disclaimer, the term of this patent is extended or adjusted under 35 U.S.C. 154(b) by 0 days.

(21) Appl. No.: 16/927,571

(22) Filed: Jul. 13, 2020

(65) Prior Publication Data

US 2021/0088453 A1 Mar. 25, 2021

Related U.S. Application Data

(60) Provisional application No. 62/906,055, filed on Sep. 25, 2019.

(51) Int. Cl.
*G01N 21/88* (2006.01)

(52) U.S. Cl.
CPC ............... *G01N 21/8806* (2013.01); *G01N 2021/8848* (2013.01); *G01N 2201/0683* (2013.01)

(58) Field of Classification Search
CPC ....... G01N 21/8806; G01N 2021/8848; G01N 2201/0683; G01N 21/88
USPC ........................................................ 356/491
See application file for complete search history.

(56) References Cited

U.S. PATENT DOCUMENTS

| | | | |
|---|---|---|---|
| 7,095,507 B1 | 8/2006 | Hwang et al. | |
| 8,379,218 B2 | 2/2013 | Deck et al. | |
| 10,830,709 B2* | 11/2020 | Smith | G02B 27/286 |
| 2005/0057757 A1 | 3/2005 | Colonna De Lega | |
| 2008/0174784 A1* | 7/2008 | Colonna De Lega | G01B 9/02088 356/511 |
| 2008/0266574 A1 | 10/2008 | Groot et al. | |
| 2008/0317201 A1 | 12/2008 | Hogan | |
| 2010/0128278 A1* | 5/2010 | Deck | G01B 9/02057 356/477 |

(Continued)

OTHER PUBLICATIONS

International Search Report and Written Opinion dated Dec. 10, 2020, from International Application No. PCT/US2020/049383, filed Sep. 4, 2020.

*Primary Examiner* — Roy M Punnoose
(74) *Attorney, Agent, or Firm* — Paradice and Li LLP

(57) ABSTRACT

Defects are detected using data acquired from an interference channel and a polarization modification channel in an interferometer. The interference objective splits a polarized illumination beam into a reference illumination that is reflected by a reference surface without modification to the polarization, and a sample beam that is reflected by a sample surface, that may modify the polarization. Light from the sample beam with no change in polarization is combined with the reference illumination and directed to the interference channel, which may measure the reflectivity and/or topography of the sample. Light from the sample beam with modified polarization is directed to the polarization modification channel. The intensity of the light detected at the polarization modification channel may be used, along with the reflectivity and topography data to identify defects or other characteristics of the sample.

23 Claims, 9 Drawing Sheets

(56) References Cited

U.S. PATENT DOCUMENTS

| | | | |
|---|---|---|---|
| 2010/0195112 A1* | 8/2010 | Davidson | G01B 9/02007 356/498 |
| 2016/0018340 A1* | 1/2016 | Otani | G01N 21/8851 356/237.2 |
| 2019/0170655 A1* | 6/2019 | Smith | G01B 9/02081 |
| 2019/0304851 A1* | 10/2019 | Smith | G01N 21/8851 |
| 2020/0103355 A1* | 4/2020 | Smith | G01N 21/8806 |

\* cited by examiner

SAMPLE SURFACE POLARIZATION MODIFICATION IN INTERFEROMETRIC DEFECT INSPECTION

CROSS REFERENCE TO RELATED APPLICATIONS

This application claims priority under 35 USC 119 to U.S. Provisional Application No. 62/906,055, entitled "SAMPLE SURFACE POLARIZATION MODIFICATION IN INTERFEROMETRIC DEFECT INSPECTION," filed Sep. 25, 2019, which is incorporated herein by reference in its entirety.

FIELD OF THE INVENTION

The present invention is related to optical inspection of samples, such as semiconductor wafers, using surface topography or reflectivity and the detection of modification of polarization.

BACKGROUND

Semiconductor and other similar industries often use optical tools for non-contact evaluation of samples during processing. One type of evaluation is defect inspection. Defects, such as particles or other irregularities on a sample, may interfere with the performance of the finished devices. Conventionally, optical tools used to detect defects use bright-field and dark-field inspection. Bright-field and dark-field detection tools detect defects based on the scattering of light caused by defects. Defect detection requires acquiring data from large portions of a sample, and often from the entire sample. As the size of semiconductor devices continues to shrink and designs become more complex, it is necessary to detect smaller defects, which is increasingly difficult with conventional optical inspection tools, such as bright-field and dark-field detection tools.

SUMMARY

Defects are detected using data acquired from an interference channel and a channel that detects polarization modification in an interferometer. The interference objective splits a polarized illumination beam into a reference illumination that is reflected by a reference surface without modification to the polarization, and a sample beam that is reflected by a sample surface, that may modify the polarization. Light from the sample beam with no change in polarization is combined with the reference illumination and directed to the interference channel, which may measure the reflectivity and/or topography of the sample. Light from the sample beam with modified polarization is directed to the polarization modification channel. The intensity of the light detected at the polarization modification channel may be used along with the reflectivity and topography data of the sample to identify defects on the sample.

In one implementation, an optical inspection apparatus may be configured to detect a defect on a sample. The optical inspection apparatus may include an interference objective that includes a polarizing beam splitter and a reference mirror. The polarizing beam splitter may be configured to receive an illumination beam that is polarized and direct a first portion of the illumination beam towards the reference mirror as reference illumination. The polarizing beam splitter may further direct a second portion of the illumination beam towards the sample as sample illumination. The reference mirror may be configured to reflect the first portion of the illumination beam to produce reflected reference illumination. The polarizing beam splitter may receive the reflected reference illumination from the reference mirror and reflected sample illumination from the sample and combine the reflected reference illumination and a first portion of the reflected sample illumination as an interference beam. The interference beam is directed along an interference channel. A second portion of the reflected sample illumination is directed along a polarization modification channel that is different than the interference channel. The optical inspection apparatus further includes a first detector in the interference channel configured to receive the interference beam and produce a first set of optical data from the sample and a second detector in the polarization modification channel configured to receive the second portion of the reflected sample illumination and produce a second set of optical data indicative of polarization modification of the sample illumination. At least one processor that is coupled to the first detector and the second detector may be configured to detect a defect on the sample using the first set of optical data and the polarization modification from the second set of optical data.

In one implementation, a method of detecting a defect on a sample may include directing a first portion of an illumination beam that is polarized towards a reference mirror as reference illumination. The reference mirror reflects the first portion of the illumination beam to produce reflected reference illumination. The method may further include directing a second portion of the illumination beam towards the sample as sample illumination, the sample reflects the second portion of the illumination beam to produce reflected sample illumination, wherein a region of the sample partially modifies the polarization of the sample illumination. The reflected reference illumination and a first portion of the reflected sample illumination from the region of the sample are combined as an interference beam which is directed along an interference channel based on polarization. A second portion of the reflected sample illumination from the region of the sample is directed along a polarization modification channel based on polarization, wherein the polarization modification channel is different than the interference channel. The interference beam in the interference channel is detected to produce a first set of optical data and the second portion of the reflected sample illumination is detected in the polarization modification channel to produce a second set of optical data indicative of polarization modification of the sample illumination. A defect on the sample is detected using the first set of optical data and the polarization modification from the second set of optical data.

In one implementation, an optical inspection apparatus may be configured to detect a defect on a sample. The optical inspection apparatus may include means for directing a first portion of an illumination beam that is polarized towards a reference mirror as reference illumination and directing a second portion of the illumination beam towards the sample as sample illumination. The reference mirror reflects the first portion of the illumination beam to produce reflected reference illumination and the sample will reflect and partially modify the polarization of the second portion of the illumination beam to produce reflected sample illumination. The optical inspection apparatus may include a means for combining the reflected reference illumination and a first portion of the reflected sample illumination as an interference beam and directing the interference beam along an interference channel. The optical inspection apparatus may include a means for directing a second portion of the reflected sample illumination along a polarization modification channel, which is different than the interference channel. The optical inspection apparatus may include a means for detecting the interference beam in the interference channel to produce a first set of optical data and a means for detecting the second portion of the reflected sample illumination in the polarization modification channel to produce a second set of optical data indicative of polarization modification of the sample illumination. The optical inspection apparatus may include a means for detecting a defect on the sample using the first set of optical data and the polarization modification from the second set of optical data.

DESCRIPTION

Figure 1:
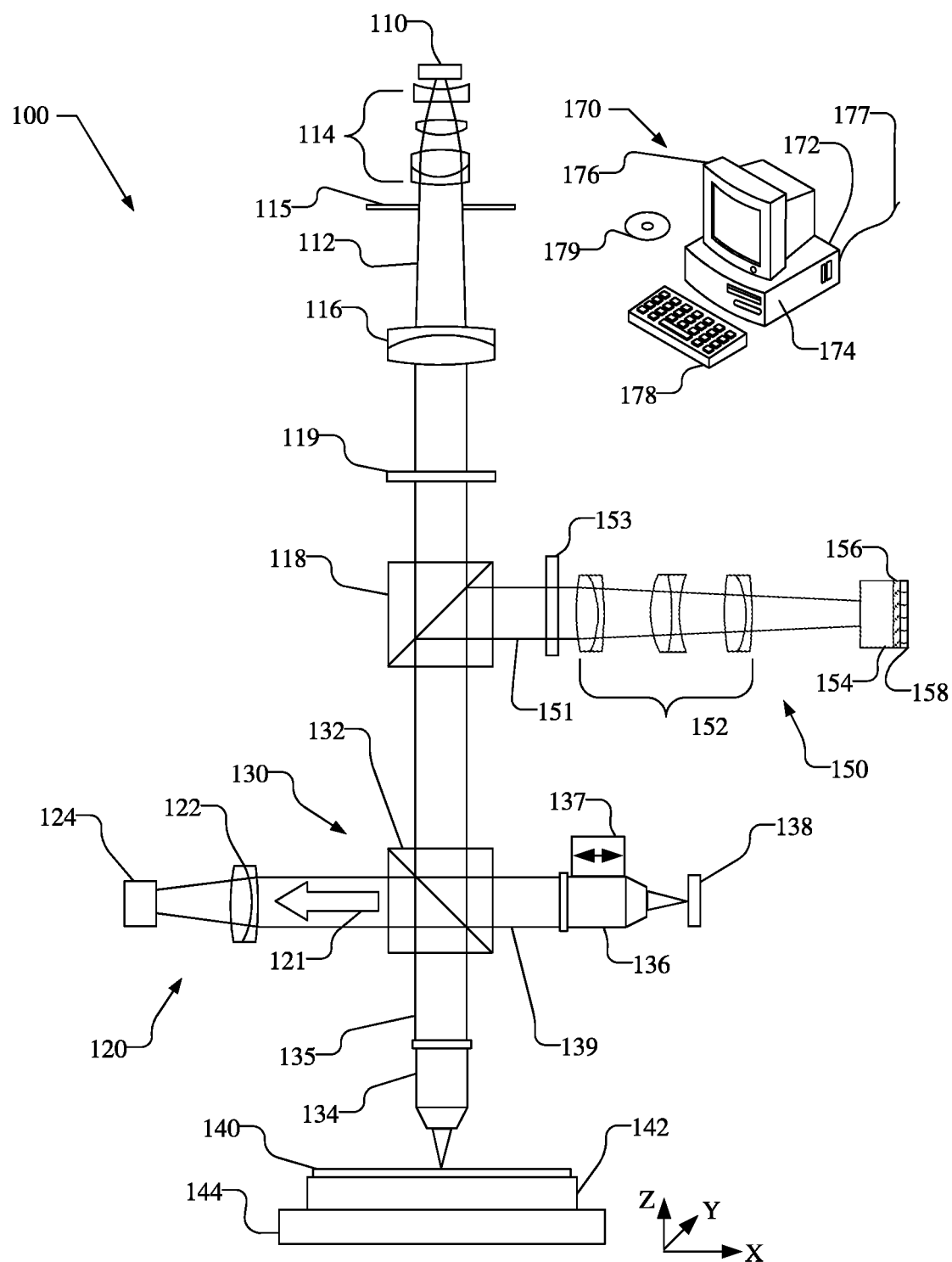
FIG. 1 illustrates a schematic view of a phase shift interferometer with a polarization modification channel to detect modification of polarized incident light by the sample.

Interferometers are optical tools, conventionally used for optical metrology, to measure height differences on the surface of sample, i.e., surface topography. Interferometers are capable of measuring height differences on an object by determining the phase of the interference signal at each pixel. Determining the phase of the signal requires obtaining multiple measurements from each point on the sample. Scanning interferometers may use polarized light and physically move (scan) along the optical axis the sample or a reference surface, which is functionally perpendicular to the surface of the sample, to modify the signal phase. Scanning interferometers typically scan in steps that produce a quarter-wave change in phase. By processing the multiple measurements at different phases from each point on the sample, the vertical height (Z) of the surface at each point on the sample may be determined, and the heights of each point may be combined to determine the topography of the sample.

A phase shifting interferometer uses polarized light and a phase mask with an array of pixels that produce multiple phase shifts so that the interferometry data with multiple phase shifts may be acquired with a single exposure. Consequently, unlike a scanning interferometer, the time per acquisition is limited only by the time to move, focus and perform pattern recognition, and the image transfer rate, and is not a function of scan time. Moreover, because a phase shifting interferometer obtains the data with a single exposure, the effects of vibration in all axes are reduced, especially those at low frequencies.

Semiconductor wafer patterns include features that act as polarizers. For example, the dominant pattern in semiconductor memory devices is a series of parallel lines, which alter the polarization of incident light. Other types of semiconductor devices similarly include patterns with parallel lines or other structures that alter the polarization of incident light.

If an interferometer that uses polarized light, such as a phase shift interferometer or a scanning interferometer that includes a polarizer, measures a sample that alters the polarization of the reflected light, the reflectivity, e.g., the intensity of the detected light, will decrease when the incident polarization vectors and any surface polarization vectors are not aligned. While circular polarized light may be used to reduce the impact of sample surface polarization, the reflected intensity will still fall by 50% for a surface that acts as a perfect linear polarizer compared to a non-polarizing surface. Alteration of the polarization orientation of incident light by the sample surface results in reflected light with a combination of different polarization orientations that are different than the polarization of the incident light, which is referred to herein as polarization modification.

As discussed herein, an interferometer that uses polarized light may detect the magnitude of polarization modification at the sample surface, thereby enabling changes in the image intensity to be assigned to the correct cause, e.g., a change in reflectivity of the sample surface or polarization modification caused by the sample surface. Additionally, the detection of polarization modification at the sample surface provides an additional channel of data that can be used to determine desired characteristics of the sample, including defect detection.

FIG. 1 illustrates a schematic view of a phase shifting interferometer 100 that is capable of surface height (Z), e.g., topography, measurements of at least a portion of the sample, and may identify changes in reflectivity or polarization modification at the sample surface. The sample, for example, may be a semiconductor wafer, flat panel substrate or other type of sample. The sample surface topography, along with identification of changes in reflectivity or polarization modification, may be used for an evaluation of the surface of the sample, such as defect inspection, as described herein.

Interferometer 100 includes an interference channel 150 that detects the intensity of the interference between light reflected from the sample 140 and light reflected from a reference mirror 138. The data from the interference channel 150 may be used to determine the reflectivity of the sample and/or a topology of the sample 140. Interferometer 100 further includes a polarization modification channel 120 that detects the occurrence and magnitude of polarization modification caused by the sample 140.

It should be understood that while FIG. 1 illustrates a polarization modification channel 120 in a phase shifting interferometer 100, the use of the polarization modification channel 120 is not limited thereto. For example, one of ordinary skill in the art may incorporate the use of a polarization modification channel 120 in other types of interferometers, such as a scanning interferometer as described in FIG. 5, based on the principles described herein.

As illustrated, interferometer 100 includes a light source 110 to produce light 112. The light source 110 may be a narrow band light source that produces a desired wavelength of light, e.g., approximately 450 nm. The light source 110, for example, may be an LED, laser or incandescent source, such as a tungsten lamp, or a plasma source or arc lamp, or any other suitable high brightness light source. One or more appropriate filters may be used in conjunction with a broadband light source to produce the desired wavelength or wavelengths of light. By way of example, a light source, such as an LED, with 20 nm full width at half maximum (FWHM) bandwidth may be used. One or more collector lenses 114 and a field stop 115 may be used to collect the light 112 from the light source 110. If desired, a Kohler illumination, critical illumination, or other intermediate form of illumination or other distribution, such as annular, may be used. By way of example, in Kohler illumination, an aperture stop (not shown) is imaged by illumination lens 116 on the back focal plane of the objectives in an interferometric objective 130 and the field stop 115 is imaged on the sample 140. The light 112 passes through a polarizer and a beam splitter 118 is used to direct a portion of the light 112 towards the interferometric objective 130. The beam splitter 118 may be a non-polarizing beam splitter. The light 112 passes through the polarizer 119, which is a linear polarizer, and may have variable orientation that is adjustable to maximize fringe contrast. If desired, the light source 110 may produce polarized light which may obviate the need for polarizer 119.

The interferometric objective 130 in FIG. 1 is illustrated, by way of example, as a Linnik geometry, but if desired, other interferometric objectives may be used, such as a Michelson or Mirau objective. The interferometric objective 130 is configured to split the incident polarized light 112 into a sample illumination 135 that is reflected from the sample 140 and a reference illumination 139 that is reflected from a reference surface 138 and to recombine the reflected sample illumination from the sample with the reflected reference illumination from the reference surface. The interferometric objective 130 may include a beam splitter 132, a sample objective 134 for imaging the surface of the test sample, and the reference mirror 138. In some implementations, e.g., in a Linnik objective geometry, as illustrated in FIG. 1, the interferometric objective 130 may further include a reference objective 136 that complements the sample objective 134. In a Michelson objective geometry, the reference objective 136 may be removed from the reference path. The beam splitter 132 is a polarizing beam splitter that transmits one polarization component and reflects the orthogonal polarization component. The beam splitter 132 separates the incident light 112 between the sample 140 and reference mirror 138 with the reference illumination 139 that is directed towards the reference surface 138 being orthogonally polarized with respect to the sample illumination 135 directed towards the sample 140. For example, the beam splitter 132 may transmit light that is linearly polarized in the plane of the angled face of the beam splitter 132 and reflect light with the orthogonal polarization. Any form of polarizing beam splitter may be used; examples with good efficiency include those with wire grid polarizing elements, or a MacNeille cube with an appropriate thin film coating at the internal angled face of the beam splitter cube. The properties of the beam splitter 132 may be matched to the bandwidth of the light source 110, as a change in polarization efficiency with wavelength will change the balance of or mix the polarization states of light in the reflected and transmitted beams. Moreover, the polarizer 119 may be set to 450 to the axes of the polarizing beam splitter 132, or if desired to some other angle, to balance the reflectivity of the sample 140 and reference mirror 138.

FIG. 1 illustrates an actuator 137 that optionally may be attached to the reference objective 136 to move the reference objective 136 along the optical axis to vary the optical path difference between the sample illumination 135 incident on the sample 140 and the reference illumination 139 incident on the reference mirror 138. Actuator 137, if included, may be used, e.g., to optimize the contrast of the interference fringes at a measurement location, and can be used for scanning the reference surface to acquire multiple phase shifts at a particular location. In practice, the reference objective 136 alone, the reference mirror 138 alone, the sample 140, or the entire optical assembly of the interferometric objective 130 may be moved along the optical axis to alter the optical path difference between the sample illumination 135 and the reference illumination 139. It should be understood, however, that with other interferometric objectives, the path difference may be varied in other ways, e.g., by moving the vertical position of the sample 140. From an optical perspective, there is no difference between the sample or the entire imaging system moving relative to each other; however, there are practical implications, i.e., the mass of the optical system may limit the selection of the stage which may in turn limit the minimum stage accuracy. It should be understood that the use of actuator 137 does not eliminate the need for a focusing system, e.g., by moving the sample relative to the optics assembly, or the optics assembly relative to the sample, or a combination of both.

As illustrated, the sample illumination 135 passes through the sample objective 134 and is incident on the sample 140, which is held on a chuck 142 mounted on a stage 144. The stage 144 is capable of horizontal motion in either Cartesian (i.e., X and Y) coordinates, or Polar (i.e., R and θ) coordinates or some combination of the two, in order to properly position each desired location on the sample relative to the interferometric objective 130 for measurement. The stage may also be capable of vertical motion along the z coordinate, e.g., for focusing or for varying the path difference. The sample illumination 135 is reflected from the sample 140 and the reflected sample illumination passes back through the sample objective 134. Similarly, the reference illumination 139 passes through reference objective 136, if used, and is incident on the reference mirror 138. The reference illumination 139 is reflected from the reference mirror 138 and the reflected reference illumination passes back through the reference objective 136.

In general, a surface will reflect incident light in a different polarization state than the incident light. The reference surface 138 is chosen to minimize this effect. Thus, the reference surface 138, e.g., mirror, is non-polarizing and will reflect the reference illumination 139 without modifying the polarization state of the reference illumination 139. Accordingly, the reflected reference illumination will be directed by the polarizing beam splitter 132 in the same manner as the reference illumination 139 was obtained from the polarizing beam splitter 132. For example, as illustrated in FIG. 1, the reference illumination 139 is obtained from the polarizing beam splitter 132 by reflection and, accordingly, the polarizing beam splitter 132 will reflect the reflected reference illumination with high efficiency towards the interference channel 150.

If the sample 140 is also non-polarizing, then the sample illumination 135 that is incident on and reflected by the sample 140 will behave similarly to the reference illumination 139. In other words, the polarization state of the sample illumination 135 will not be modified by the sample 140, and after being reflected by the sample 140 the reflected sample illumination 135 will have the same polarization state as the incident sample illumination. In this case, the polarizing beam splitter 132 will direct the reflected sample illumination in the same manner as the sample illumination 135 was obtained from the polarizing beam splitter 132. For example, as illustrated in FIG. 1, the sample illumination 135 is obtained from the polarizing beam splitter 132 by transmission and, accordingly, the polarizing beam splitter 132 will transmit the reflected sample illumination with high efficiency towards the interference channel 150, where the reflected sample illumination and reflected reference illumination will interfere with each other.

The interference channel 150 receives a combined beam 151, which includes the reflected reference illumination 139 and a portion of the reflected sample illumination 135, which has a polarization that was unmodified by the sample 140. The interference channel 150 includes, e.g., one or more optical components 152, e.g., lenses, and a detector 154, that receives the combined beam 151. A quarter wave plate 153 in the interference channel 150 converts the orthogonally polarized beams into opposite direction circularly polarized light, e.g., the p-polarized sample illumination from the sample 140 is converted into right-hand circular polarization and the s-polarized reference illumination from the reference mirror 138 is converted into left hand circular polarization. The optical components 152 image the combined light 151 onto the detector 154, which may be a camera. The detector 154 includes a phase mask 156 with an array of pixels that produce multiple phase shifts before a detector array 158, such as a CCD array that is aligned pixel-to-pixel with the array of pixels in the phase mask 156, and which are located in substantially the same image planes. The combined beam 151 passes through the pixel array of the phase mask 156 creating a number (N) of interleaved samples of the interference pattern on the detector array 158, with, e.g., the same magnitude of phase difference between each sample. Thus, the detector 154 receives an image of non-polarizing aspects of the sample combined with the reference signal, which, due to a small path difference, creates an interferogram. The different phase shift elements in the phase mask 156 produce an interleaved image of a number (N) samples, each with the same phase shift, i.e. there are N different samples of the interferogram as function of phase. Groups of nearby samples (pixels) with different phase shifts may be processed together to obtain the local height. The phase mask 156, by way of example, may be a pixel array of linear polarizers arranged in groups of four, e.g., with polarizer orientation 0°, 45°, 900 and 135°, that introduce phase shifts between the signal and reference illuminations that is twice the referenced polarizer orientation. The phase mask 156 and detector array 158 may be, e.g., a Phasecam manufactured by Onto Innovation Inc. using a wire grid polarizer array manufactured by Moxtek.

Figures 2A, 2B:
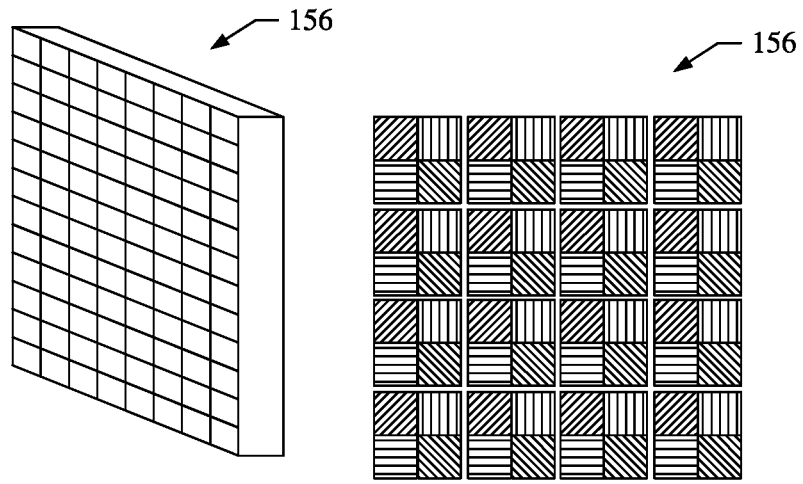
FIGS. 2A and 2B illustrate a side perspective view and a top plan view of a phase mask.
Figure 2C:
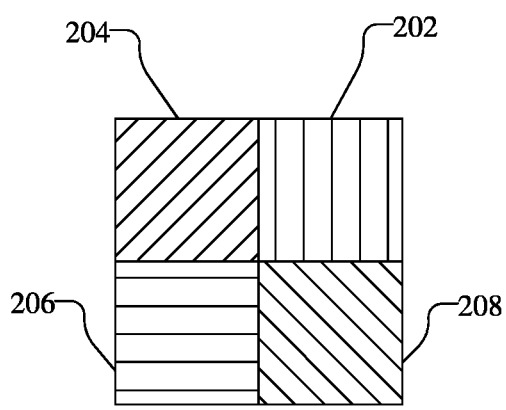
FIG. 2C illustrates a unit portion of the phase mask that includes a 2×2 array of polarizer pixels with four discrete polarizations, which are repeated over the entire phase mask.

FIGS. 2A and 2B illustrate a side perspective view and a top plan view of the phase mask 156. FIG. 2C illustrates a unit portion of the phase mask 156 that includes a 2×2 array of polarizer pixels, 202, 204, 206, and 208 with four discrete polarizer orientations (0°, 45°, 90°, 135°), with the unit portion repeated over the entire phase mask 156, so that the phase mask 156 includes a repeated array of pixels having discrete polarizer orientations. The polarizer pixels 202, 204, 206, and 208 orientations at 0°, 45°, 90°, and 1350 enable interference with phase shifts of 0°, 90°, 180°, and 270°, respectively, between the sample illumination 135 and reference illumination 139. The pixels in the array of the phase mask 156 have a size and spacing that match the size and spacing of the pixels in the detector array 158, so that each pixel in the detector array 158 is matched, i.e., aligned, with a corresponding pixel of the phase mask 156.

Other arrangements of the detector 154 are possible. For example, if desired, phase shift steps other than 90° may be used. Moreover, it may be advantageous to use more than four phase shifts in a unit. Further, the arrangement of the pixels need not be in the order shown in FIG. 2C. Other types of arrangements of pixels that may be used are described further in the U.S. patent application Ser. No. 16/197,929, entitled "Interferometer with Pixelated Phase Shift Mask," filed Nov. 21, 2018, which is incorporated by reference in its entirety.

The interference channel 150 detects a phase difference between the sample illumination 135 and the reference illumination 139, which are orthogonally polarized by the polarizing beam splitter 132. The quarter wave plate 153, converts the linearly polarized sample illumination 135 and reference illumination 139 to left- and right-hand circular polarizations, which interfere after passing through the phase mask 156. The detector array 158 receives the resulting light after interference and detects the intensity at each pixel in the detector array 158.

As noted above, in general, a surface will reflect incident light in a different polarization state than the incident light. Thus, referring back to FIG. 1, the surface of the sample 140 is likely to alter the polarization state of the incident light. If one or more regions within the illumination spot on the surface of the sample 140 modifies the polarization of the sample illumination 135, then the reflected sample illumination 135 for these regions will have a mixture of polarization components. Some light may become depolarized, but for the regular structures encountered, e.g., on a semiconductor wafer, the dominant return signal will remain polarized. The mixture of polarization components in the reflected sample illumination will be the sum of a component with the same polarization state as the incident sample illumination 135 and another component that is orthogonal to it. As discussed above, the polarizing beam splitter 132 will direct the reflected sample illumination with a polarization component that is parallel to the incident sample illumination 135 towards the interference channel 150. For example, as illustrated in FIG. 1, the portion of the reflected sample illumination with a polarization component that is the same as the incident sample illumination will be transmitted towards the interference channel 150, where that portion of the reflected sample illumination and reflected reference illumination will interfere with each other. The modulation intensity of the interference signal detected in the interference channel 150 after the test path signal combines with the reference path signal will be lowered by the amount of light that is lost due to modification of the polarization by to the sample 140.

The portion of the reflected sample illumination with a polarization component that is orthogonal to the incident sample illumination 135 will be directed by the polarizing beam splitter 132 towards the polarization modification channel 120, as indicated by arrow 121. For example, as illustrated in FIG. 1, the sample illumination 135 is obtained from the polarizing beam splitter 132 by transmission and, accordingly, the polarizing beam splitter 132 will reflect the portion of the reflected sample illumination with an orthogonal polarization component with high efficiency towards the polarization modification channel 120. Of course, if the region of the sample 140 modifies the polarization to a state that is not completely orthogonal to the polarization state of the sample illumination, the polarizing beam splitter 132 will still direct the reflected sample illumination with the modified polarization, but with less efficiency, e.g., less than all of the reflected sample illumination with modified polarization will be directed to the polarization modification channel 120, while the remaining portion of the reflected sample illumination with modified polarization may be directed to the interference channel 150.

The polarization modification channel 120 includes, e.g., one or more optical components 122, e.g., lenses, and a detector 124. The detector 124, for example, may be a camera, that receives the modified polarization sample illumination. The detector 124 thus receives the modified polarization sample illumination to detect the occurrence and magnitude of polarization modification at the sample 140. The detector 124 may receive an image of the sample 140 from which it can detect the magnitude of polarization modification produced by the sample. The image of the sample 140 received by detector 124 may be aligned with the image of the sample received by detector 154 in the interference channel 150, e.g., so that corresponding pixels in the separate detectors 124 and 154 correspond to the same location on the sample 140.

The interference detector 154 and the polarization modification detector 124 are coupled to a computer 170, such as a workstation, a personal computer, central processing unit or other adequate computer system, or multiple systems. The computer 170 is preferably included in, or is connected to or otherwise associated with interferometer 100. The computer 170 may also control the movement of the stage 144, as well as control the operation of the chuck 142. The computer 170 also collects and analyzes the interferometric data and polarization modification data obtained the interference detector 154 and the polarization modification detector 124 as discussed herein. For example, the computer 170 may analyze the interferometric data and polarization modification data to determine one or more physical characteristics of the sample 140, such as the presence of a defect, as discussed below. The computer 170, which includes at least one processor 172 with memory 174, as well as a user interface including e.g., a display 176 and input devices 178. A non-transitory computer-usable storage medium 179 having computer-readable program code embodied may be used by the computer 170 for causing the at least one processor to control the interferometer 100 and to perform the functions including the analysis described herein. The data structures and software code for automatically implementing one or more acts described in this detailed description can be implemented by one of ordinary skill in the art in light of the present disclosure and stored, e.g., on a computer-usable storage medium 179, which may be any device or medium that can store code and/or data for use by a computer system such as processor 172. The computer-usable storage medium 179 may be, but is not limited to, magnetic and optical storage devices such as flash drive, disk drives, magnetic tape, compact discs, and DVDs (digital versatile discs or digital video discs). A communication port 177 may also be used to receive instructions that are used to program the computer 170 to perform any one or more of the functions described herein and may represent any type of communication connection, such as to the internet or any other computer network. The communication port 177 may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

With the use of phase mask, as illustrated in FIG. 1, the surface height z at a single location represented by a unit of pixels may be determined as the signal is detected at four different phases simultaneously. If all four pixels are at the same height, z, the signals $S_i$ (where i is the phase shift at each pixel expressed as a multiple of 90°, and it should be understood that a phase shift of 360° is the same as a phase shift of 0°) received in the 2×2 unit of pixels may be used to calculate the surface height z, e.g., using $$z = \frac{\lambda}{4\pi} \tan^{-1}\left(\frac{S_1 - S_3}{S_2 - S_4}\right) \qquad \text{eq. 1}$$

Thus, the height z, can be determined using equation 1 from the four phase signals if the wavelength of the light source, $\lambda$, is known. Other means of calculating these parameters from four measured intensities, or from a different number of intensities, are possible as will be apparent to those of ordinary skill in the art.

By way of example, the surface height z may be determined using three known phase shifts. For example, with three samples ($S_i$, i=1,2,4), the surface height z may be determined from:

$$\tan(kz) = 2\left(\frac{S_4 - S_1}{S_4 - S_2}\right) - 1. \qquad \text{eq. 2}$$

It should be understood that different samples $S_i$ may be selected, and that other means of calculating these parameters from three measured intensities are possible as will be apparent to those of ordinary skill in the art.

Advantageously, because phase shift interferometers, such as interferometer 100, can determine the topography of a sample surface from a single captured image, these devices are capable of quickly inspecting the entire surface of a sample, e.g., a semiconductor wafer, for defects, e.g., at rates comparable to conventional inspection tools, such as bright field and dark field inspection tools, while providing additional information not available in conventional tools, such as topography and surface polarization, while providing additional information not available in conventional tools, such as topography and surface polarization. Further, with all data obtained within a single exposure, the effects of vibration in all axes are reduced, especially those at low frequencies. The sensitivity of the phase shift interferometers is adequate to detect surface height variation caused by defects and the lateral resolution may be configured, e.g., with desired image size (e.g., pixel size and array size), and objective magnification, to capture desired defects of interest, e.g., having a lateral size from 0.2 µm to at least 100 µm. For example, in one embodiment, the pixel size may be matched to the resolution of the interferometer. With a wavelength of 450 nm and instrument numerical aperture (NA) of 0.30, the instrument resolution using the Sparrow limit ($\lambda$/2NA) is 750 nm. Using a pixel size of 750 nm sets the effective tool resolution to 1.5 µm (because the measurement uses a 2×2 pixel kernel) while providing the largest possible acquisition area from each camera image, and hence the best sample acquisition rate. The detection of even smaller defects may be performed and used herein and is described further in the U.S. patent application Ser. No. 16/197,737, entitled "Sub-Resolution Defect Detection," filed Nov. 21, 2018, which is incorporated by reference in its entirety.

Figure 3:
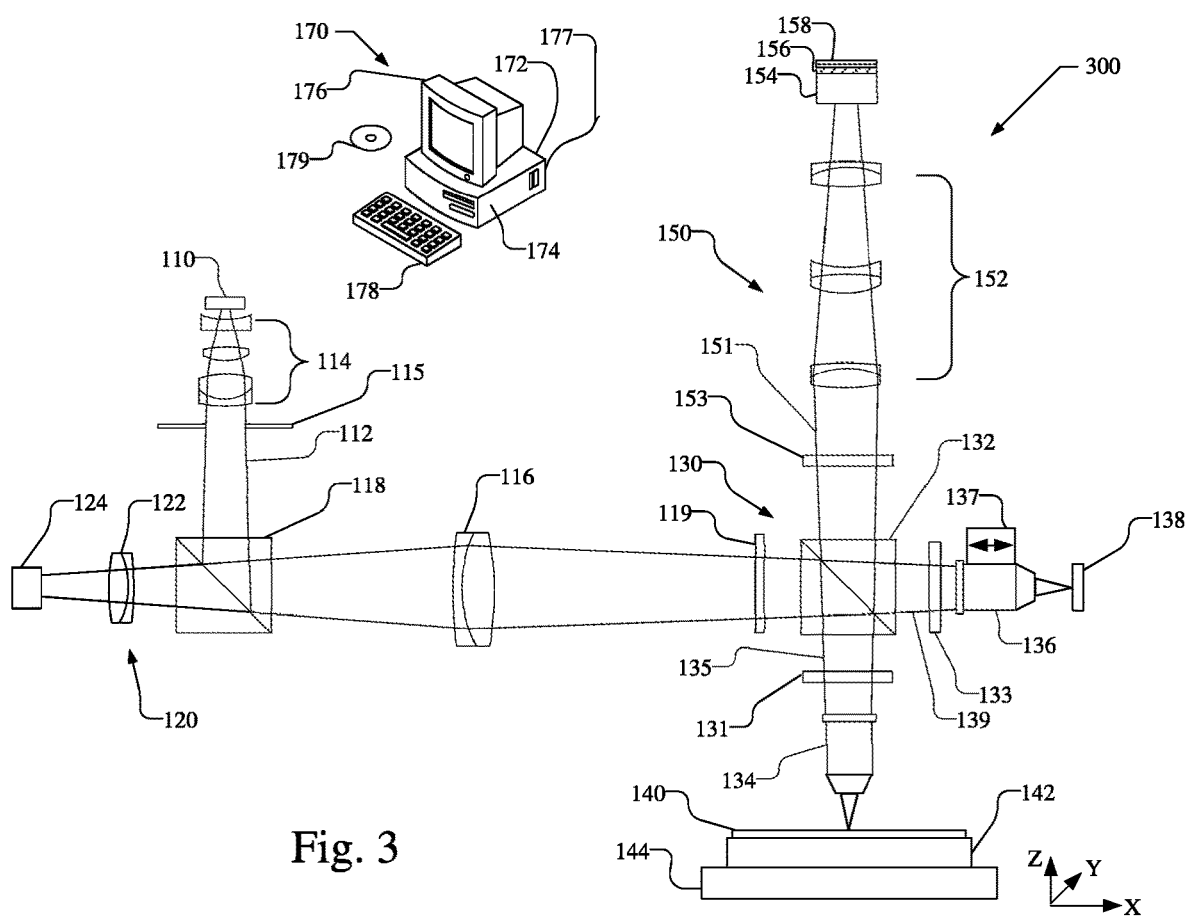
FIG. 3 illustrates a schematic view of another phase shift interferometer with a polarization modification channel to detect modification of polarized incident light by the sample.

FIG. 3 illustrates another phase shifting interferometer 300 that uses a polarization modification channel 120 to detect polarization modification of the sample 140. Phase shifting interferometer 300 is similar to phase shifting interferometer 100, shown in FIG. 1, like designated elements being the same. Phase shifting interferometer 300 differs from phase shifting interferometer 100 in layout and by use of circular polarization, rather than linear polarization as used by phase shifting interferometer 100.

As illustrated in FIG. 3, the phase shifting interferometer 300 includes a beam splitter 118 that directs (e.g., reflects) the light towards the interferometric objective 130 via a polarizer 119, and directs (e.g., transmits) reflected sample illumination having a polarization component that is modified by the sample 140 towards the polarization modification channel 120. The polarizing beam splitter 132 is illustrated as reflecting the sample illumination towards the sample 140 and transmitting the reference illumination 139 towards the reference surface 138, and transmitting light towards the interference channel 150.

The polarizer 119 may be a linear polarizer, but in some embodiments may be a circular polarizer, and may have variable orientation that is adjustable to maximize fringe contrast. Quarter wave plates 131 and 133 are positioned before the sample 140 and the reference mirror 138, e.g., between the beam splitter 132 and the objective 134 and the objective 136, if used. As illustrated, the sample illumination 135 passes through the quarter wave plate 131 and the sample objective 134 and is incident on the sample 140. The sample illumination 135 is reflected from the sample 140 and the reflected sample illumination passes back through the sample objective 134 and quarter wave plate 131. Similarly, the reference illumination 139 passes through the quarter wave plate 133 and reference objective 136, if used, and is incident on the reference mirror 138. The reference illumination 139 is reflected from the reference mirror 138 and the reflected reference illumination passes back through the reference objective 136 and quarter wave plate 133.

The quarter wave plates 131 and 133 convert the orthogonally polarized beams from the polarizing beam splitter 132 into circularly polarized light with opposite directions, e.g., a p-polarized beam is converted into right-hand circular polarization and an s-polarized beam is converted into left hand circular polarization. Thus, if the fast axes of the quarter wave plates 131 and 133 are parallel, then the sample illumination 135 and reference illumination 139, after passing through quarter wave plates 131 and 133 are circularly polarized, with opposite sense. With the use of circularly polarized light in each of the sample and reference paths, each path must make one reflection and one transmission in the polarizing beam splitter 132 thereby balancing the effect of any imbalance in the polarization efficiency of the polarizing beam splitter 132.

The reference surface 138 is non-polarizing and will reflect the reference illumination 139 without modifying the polarization state of the reference illumination 139. After passing back through the quarter wave plate 133, the reflected reference illumination will become linearly polarized but with a polarization state that is orthogonal to the polarization state of the incident reference illumination. Accordingly, the polarizing beam splitter 132 will direct, e.g., reflect, as illustrated in FIG. 3, the reflected reference illumination with high efficiency towards the interference channel 150.

If the sample 140 is non-polarizing, then the sample illumination 135 that is incident on and reflected by the sample 140 will behave similarly to the reference illumination 139. In other words, the polarization state of the sample illumination 135 will not be modified by the sample 140, and after being reflected by the sample 140 and passing back through the quarter wave plate 131, the reflected sample illumination 135 will become linearly polarized, with a polarization state that is orthogonal to the polarization state of the incident sample illumination. Accordingly, the polarizing beam splitter 132 will direct, e.g., transmit, as illustrated in FIG. 3, the unmodified reflected sample illumination with high efficiency towards the interference channel 150, where the reflected sample illumination and reflected reference illumination will interfere with each other.

If the surface of the sample 140 modifies the polarization of the sample illumination 135, then after passing through the quarter wave plate 131, the reflected sample illumination 135 will have a mixture of linear polarization components. After passing through the quarter wave plate 131, the portion of the reflected sample illumination with a polarization component that was not modified by the sample 140 will have a polarization state that is orthogonal to the polarization state of the incident sample illumination and will be directed by the polarizing beam splitter 132, e.g., transmitted as illustrated in FIG. 3, towards the interference channel 150, where the sample illumination and reflected reference illumination will interfere with each other, as discussed above. The modulation intensity of the interference signal detected in the interference channel 150 after the test path signal combines with the reference path signal will be lowered by the amount of light that is lost due to modification of the polarization by the sample 140.

The portion of the reflected sample illumination 135 with polarization that is modified by the sample 140 will pass through the quarter wave plate 131, and will at least partially be directed by the polarizing beam splitter 132, e.g., reflected as illustrated in FIG. 3, back in the direction of the incident beam 112, i.e., towards the polarization modification channel 120. For example, if the circular polarization of the sample illumination is completely converted to the opposite circular polarization state by the sample 140, then after passing back through the quarter wave plate 131, the reflected sample illumination will become linearly polarized, with a polarization component that is orthogonal to the polarization component of the incident sample illumination. The polarizing beam splitter 132 will direct the portion of the reflected sample illumination with the modified polarization with high efficiency towards the polarization modification channel 120. Of course, if the region of the sample 140 modifies the polarization to a state that is not completely orthogonal to the polarization state of the sample illumination, the polarizing beam splitter 132 will still direct the reflected sample illumination with the modified polarization, but with less efficiency, e.g., less than all of the reflected sample illumination with modified polarization will be directed to the polarization modification channel 120, while the remaining portion of the reflected sample illumination with modified polarization may be directed to the interference channel 150.

The portion of the sample illumination with polarization that is modified by the sample 140 is directed by the beam splitter 118 towards the polarization modification channel 120, which detects the magnitude of polarization modification produced by the sample, as discussed above.

Figure 4:
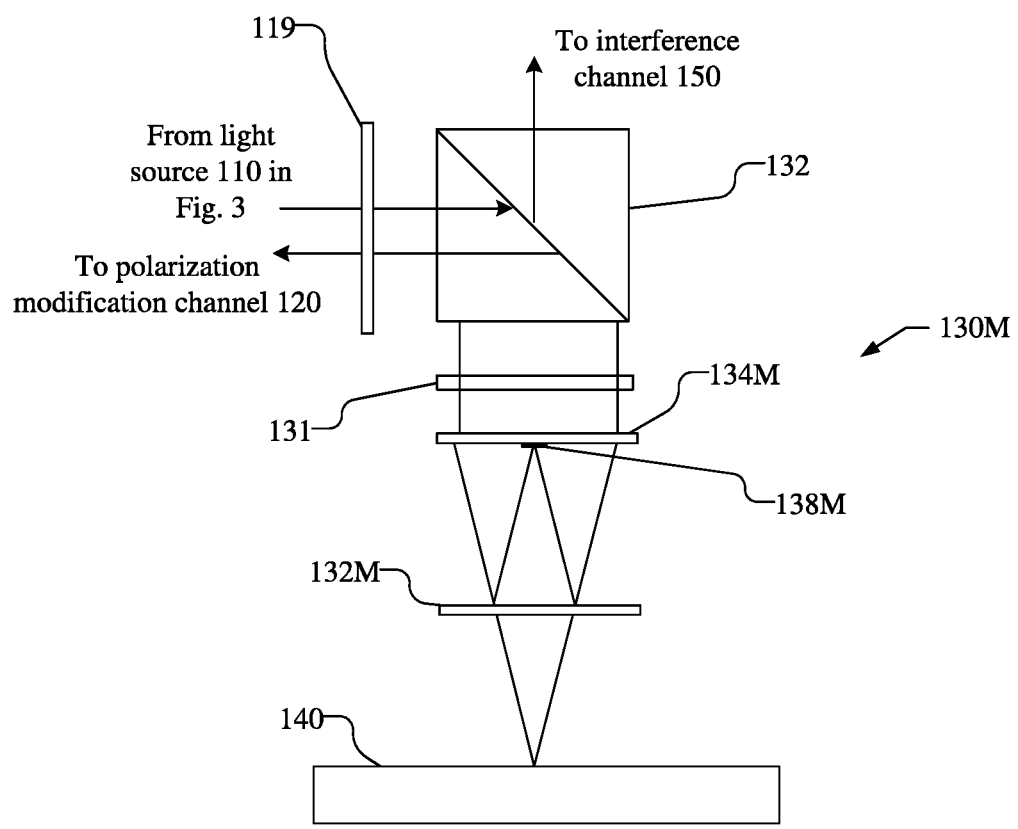
FIG. 4 illustrates a schematic view of a Mirau objective.

While the interferometric objective 130 illustrated in FIG. 3 has a Linnik geometry (or Michelson geometry if the reference objective 136 is removed), as discussed above, other interferometric objective geometries, such as a Mirau objective, may be used. FIG. 4 illustrates a Mirau objective 130M that may be used as the interferometric objective in the interferometer 100. With a Mirau objective 130M, the polarizing beam splitter 132 receives a polarized illumination beam from the polarizer 119 and directs all of the illumination beam towards the Mirau objective 130M, e.g., the polarizer 119 may be set to 0° to the axes of the polarizing beam splitter 132. The Mirau objective 130M includes a beam splitter 132M and a pupil 134M, which may be a lens, and a reference mirror 138M positioned on the pupil 134M, e.g., in the center. As illustrated, a quarter wave plate 131 is disposed between the beam splitter 132, and the Mirau objective 130M, and in the absence of polarization modification by the sample causes the polarization of the reflected reference illumination and reflected sample illumination at the beamsplitter 132 to be orthogonal to their incident linear polarization direction. Similar to the operation described in FIG. 3, the polarizing beam splitter 132 directs the reflected reference illumination and the portion of reflected sample illumination with unmodified polarization to the interference channel 150, and directs the reflected sample illumination with the modified polarization to the polarization modification channel 120. The choice of objective may be restricted depending on the polarization state of light in the instrument. If desired, the function of quarter wave plate 131 may be included in the beamsplitter 132M and pupil 134M. For example, the reference mirror 138M on the pupil 134M may include a circular polarizer. The orientation of the polarization of the reflected sample illumination and reflected reference illumination are parallel, whereas the phase mask interferometer shown in FIG. 3 requires orthogonal polarization. Hence a Mirau objective may be preferably used with the scanning interferometer of FIG. 5 described below. If linear polarization is used, as discussed in FIG. 1, rather than circular polarization discussed in FIG. 3, the Mirau objective 130M may be used without a quarter wave plate 131 and the interference channel 150 and polarization modification channel 120 are respectively parallel and perpendicular with the light from the sample 140.

Figure 5:
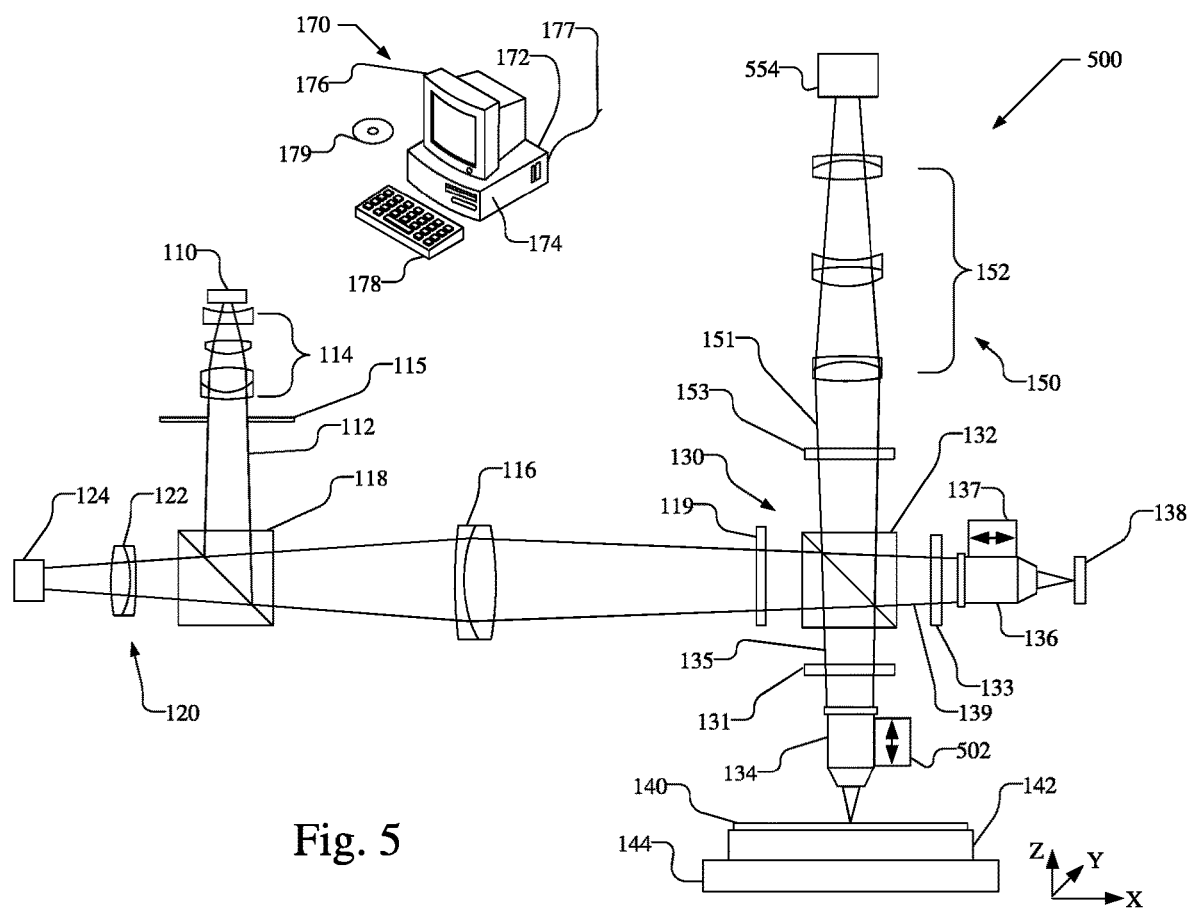
FIG. 5 illustrates a schematic view of a scanning interferometer with a polarization modification channel to detect modification of polarized incident light by the sample.

FIG. 5 illustrates another scanning interferometer 500 that may use a polarization modification channel 120 to detect polarization modification of the sample 140. The scanning interferometer 500 may be similar to phase shifting interferometer 100, like designated elements being the same. The scanning interferometer 500, for example, may include an interference channel 150 and the polarization modification channel 120, as discussed. The scanning interferometer 500 may include an actuator 502 coupled to the objective 134, which is controlled by the computer system 170, to adjust the vertical position (Z height) of the objective 134 along the optical axis, so that interference signals at multiple phase shifts may be acquired. Additionally, or alternatively, the vertical position (Z height) of the sample 140 may be adjusted using the stage 144. As a further alternative, scanning may be achieved by moving the reference mirror in a direction parallel to the optical axis, or by moving the reference objective 136 alone using actuator 137. Scanning interferometer 500 may use a detector 554, such as a camera, without a phase array, to detect the interference signal at multiple phase shifts, from which the surface height at each location, and thus, a topography of the sample may be generated or reflectivity measurements at each location of the sample may be generated, as is well known in the art.

Figure 6:
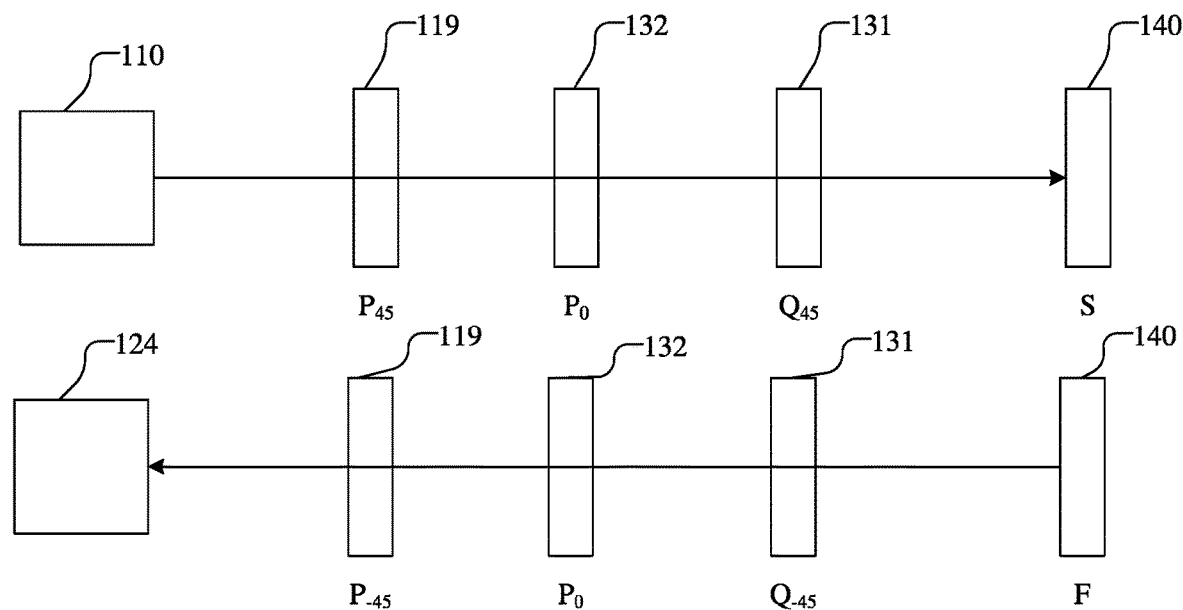
FIGS. 6 and 7 are simplified diagrams illustrating the evolution of polarization in the sample light path and reference mirror light path, respectively, for an electric field system model for the polarization modification channel.
Figure 7:
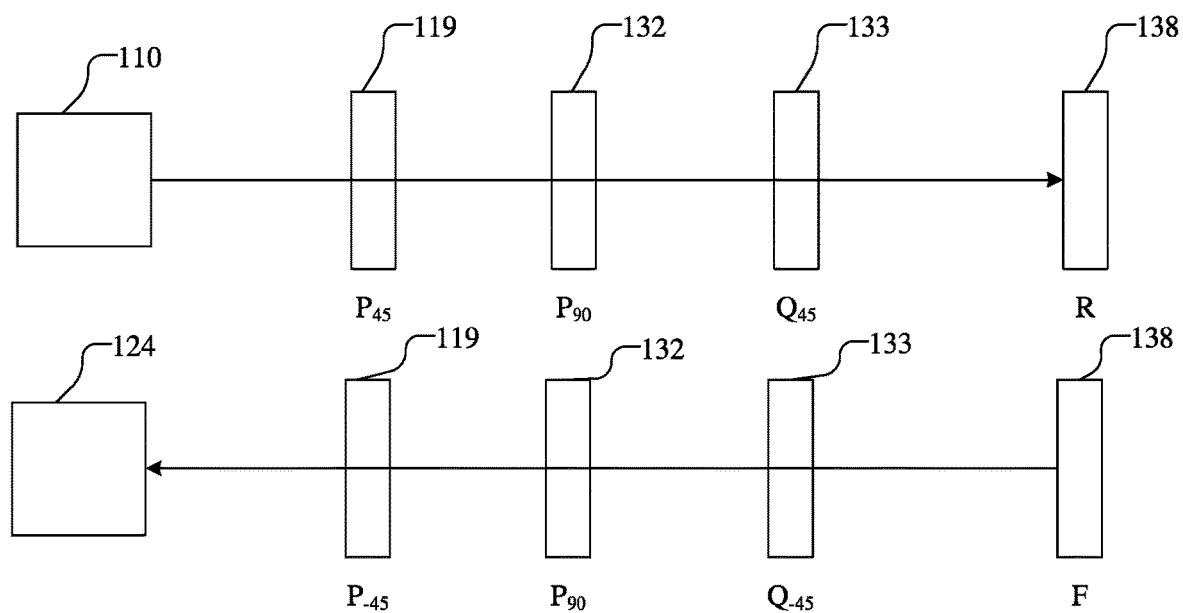

FIGS. 6 and 7 are simplified diagrams illustrating the evolution of polarization in the sample light path and reference mirror light path, respectively, for an electric field system model for the polarization modification channel 120 shown in FIGS. 3 and 5. A similar electric field system model may be generated for FIG. 1, e.g., with the removal of the quarter wave plates 131 and 133. An electric field system model for the polarization modification channel 120 may be generated based on the following assumptions: depolarization induced by the optical elements is ignored, the polarizers are assumed to be ideal, the input light is completely unpolarized, no diattenuation is included, and for the purpose of discussion only the axial ray is included (angle of incidence and azimuth angle are both zero). Each of these assumptions may be removed to improve the system model as desired. The input polarizer 119 is set to 450 to the axes of the polarizing beam splitter 132, or if desired to some other angle to balance the reflectivity of the sample 140 and reference mirror 138. The polarizing beam splitter 132 acts as a linear polarizer, sending light in one polarization state to the sample 140 and light in the orthogonal polarization state to the reference mirror 138. For convenience, the equivalent linear polarizer is represented as P0 for light directed to the sample and P90 for light to the reference mirror, but the angles may be varied according to the operation of the polarizing beam splitter 132. The quarter wave plates 131 and 133 are set at angles of 45° with respect to the polarization direction. If desired, the fast axis of the quarter wave plates 131 and 133 in both the signal and reference channels may be parallel to each other, or they may be at 90 to each other. Light is reflected by the sample 140 or by the reference mirror 138, and on return the polarizing components operate as if rotated by 90°. Under these assumptions the out coming electric field vector for the rays that strike the sample 140 for the configuration of the optical metrology device 100 with the polarizers 119, 132, and 131 and pass into the polarization modification channel 120 may be written in matrix form as follows.

$$E_{sample}=P_{-45}P_0Q_{-45}FSQ_{45}P_0P_{45}E_{in} \qquad (Eq.1)$$

where each of the terms is described in the following Table 1. FIG. 6 illustrates the evolution of polarization in the sample light path from the light source 110 to the polarization modification detector 124, where the top part of FIG. 6 illustrates the path of light emitted by the light source 110 and incident on the sample 140 and the lower part of FIG. 6 illustrates the light path of the light reflected by the sample 140 and received by the polarization modification detector 124.

Similarly, the out coming electric field vector for the rays that strike the reference mirror 138 for the configuration of the optical metrology device 300 with the polarizers 119, 132, and 133 and pass into the polarization modification channel 120 may be written in matrix form as follows.

$$E_{mirror}=P_{-45}P_{90}Q_{-45}FRQ_{45}P_{90}P_{45}E_{in} \qquad (Eq.2)$$

where each of the terms is described in the following Table 1. FIG. 7 illustrates the evolution of polarization in the reference mirror light path from the light source 110 to the polarization modification detector 124, where the top part of FIG. 7 illustrates the path of light emitted by the light source 110 and incident on the reference mirror 138 and the lower part of FIG. 7 illustrates the light path of the light reflected by the reference mirror 138 and received by the polarization modification detector 124.

TABLE 1

| | |
|---|---|
| $E_{in} = \begin{bmatrix} e_1 \\ 0 \end{bmatrix} + \begin{bmatrix} 0 \\ e_2 \end{bmatrix}$ | Electric field vector (incoherent superposition) |
| $P_\theta = \begin{bmatrix} \cos^2\theta & \sin\theta\cos\theta \\ \sin\theta\cos\theta & \sin^2\theta \end{bmatrix}$ | Jones Matrix for Linear Polarizer |
| $S = \begin{bmatrix} s_{pp} & s_{ps} \\ s_{sp} & s_{ss} \end{bmatrix}$ | Jones Matrix of the sample |
| $R = \begin{bmatrix} r_{pp} & r_{ps} \\ r_{sp} & r_{ss} \end{bmatrix} \approx \begin{bmatrix} r_{pp} & 0 \\ 0 & r_{ss} \end{bmatrix}$ | Jones Matrix of reference mirror |
| $F = \begin{bmatrix} 1 & 0 \\ 0 & -1 \end{bmatrix}$ | Reflection Matrix |
| $Q_\theta = e^{-\frac{i\pi}{4}} \begin{bmatrix} \cos^2\theta + i\sin^2\theta & (1-i)\sin\theta\cos\theta \\ (1-i)\sin\theta\cos\theta & \sin^2\theta + i\cos^2\theta \end{bmatrix}$ | Quarter wave plate |

If desired, the effect of reflection on the electric fields may be included in the calculation of the Jones matrix for the sample, S, or reference mirror, R, in which case the reflection term F would not be used in equations 1 or 2.

In the general case, the incident electric field $E_{In}$ will vary with spatial frequency, k, as well as with position in the pupil. Additionally, the model includes contributions from the sample, S, as well as the polarizers and the beamsplitter, including the effect of diattenuation in the beam splitters and other components.

With the approximation $r_{sp}=r_{ps}=0$ the signal intensity in the polarization modification channel 120 is $$I_{polarization\ mixing} = |E_{sample} + E_{mirror}|^2 \quad \text{(Eq. 3)}$$

$$\frac{I_{polarization\ mixing}}{|E_{in}|^2/16} = | \quad \text{(Eq. 4)}$$

$$r_{pp} - r_{ss}|^2 + |s_{pp} - s_{ss}|^2 + |s_{sp} + s_{ps}|^2 + 2|r_{pp} - r_{ss}||s_{ss}*s_{pp}|$$

If the reference mirror 138 and sample 140 are perfect reflectors, so that $r_{pp}=r_{ss}$, $s_{pp}=s_{ss}$ and $s_{ps}=s_{sp}=0$, then as expected there is no signal in the polarization modification channel 120. The term $|r_{pp}-r_{ss}|$ is constant unless the reference mirror 138 is changed. A signal in the polarization modification channel 120 therefore indicates different sample reflection coefficients $s_{pp}$ and $s_{ss}$, or significant depolarization terms s, and sp. For a perfect reference mirror ($r_{pp}=r_{ss}$, $r_{ps}=r_p=0$), eq. 4 becomes $$\frac{I_{polarization\ mixing}}{|E_{in}|^2/16} = |s_{pp} - s_{ss}|^2 + |s_{sp} + s_{ps}|^2 \quad \text{(Eq. 5)}$$

By comparison, a simple form for the magnitude of the signal in the interference channel 150 with no path difference between the sample and reference illuminations and a perpendicular (0°) phase mask element is $$\frac{I_{interference}}{|E_{in}|^2/16} = |r_{pp} + r_{ss}|^2 + |s_{pp} + s_{ss}|^2 + |s_{sp} - s_{ps}|^2 \quad \text{(Eq. 6)}$$

An area of lower reflectivity on the sample 140 that does not mix the polarization of the sample illumination 135, i.e. one with $s_{pp}=s_{ss}<1$ and $s_{sp}=s_{ps}=0$, will produce a lower intensity image at the interference detector 154 than one with perfect reflectivity ($s_{pp}=s_{ss}=1$), but will produce no signal in the polarization modification detector 124.

An area on the sample 140 for which $s_{pp}\neq s_{ss}$ and/or $s_{sp}+s_{ps}\neq 0$ will produce a lower intensity image at the interference detector 154 but will also produce a signal in the polarization modification detector 124. An example of such an area is a set of parallel lines, as is commonly found in semiconductor devices. These areas act as linear polarizers and one of sp, and $s_{ss}$ is close to zero. Other areas with more complex two- or three-dimensional patterns, and those with anisotropic materials such as diamond-like carbon, may also significantly mix polarization states such that one or both of $s_{sp}$ and $s_{ps}$ are not zero.

If the reference mirror 138 and sample 140 are perfect elements, e.g. $r_{pp}=r_{ss}$, $s_{pp}=s_{ss}$ and $s_{ps}=s_{sp}=$, then there is no signal in the polarization modification channel 120. This channel may therefore operate with higher gain than the interference channel 150, and hence may detect smaller imbalances in the sample reflection coefficients. Normally, the off-diagonal terms $s_{ps}$ and $s_{sp}$ in the sample reflectance Jones Matrix are much smaller than the diagonal terms $s_{pp}$ and $s_{ss}$. Because the "normal" signal in the polarization mixing channel 120 is zero, operating at high gain allows areas with weak depolarization ($s_{sp}+s_{ps}\neq 0$) to be detected even if the impact on the main interefence signal is small because $s_{sp}+s_{ps}\ll s_{pp}+s_{ss}$. The polarization modification channel 120 can therefore identify certain differences between areas with supposedly identical patterns that cause a change in the off-diagonal sample reflectance terms. Examples of such effects include changes in pattern line width, relative height and material properties, as is well known because these effects are the basis for the use of reflectance variation in measuring sub-resolution pattern properties by Optical Critical Dimension (OCD) tools, also referred to as scatterometers. An example of such a device is the Atlas III OCD system manufactured by Nanometrics, Inc. In the current implementation, the change in signal in the polarization modification channel 120 between areas with the same intended pattern is additional information that can be used to identify defects in the pattern by the modification made by the defect to the local reflectance coefficients.

Thus, a comparison of the intensities of signals received at the interference detector 154 and the polarization modification detector 124 will enable a determination of the magnitude of polarization modification and reflectivity variations. Further, corresponding pixels of the interference detector 154 and the polarization modification detector 124 may be aligned and mapped to physical locations on the sample 140. Thus, by imaging the sample 140 at both the interference detector 154 and the polarization modification detector 124, the polarization modification and reflectivity variations may be mapped to specific locations on the sample 140.

Figure 8:
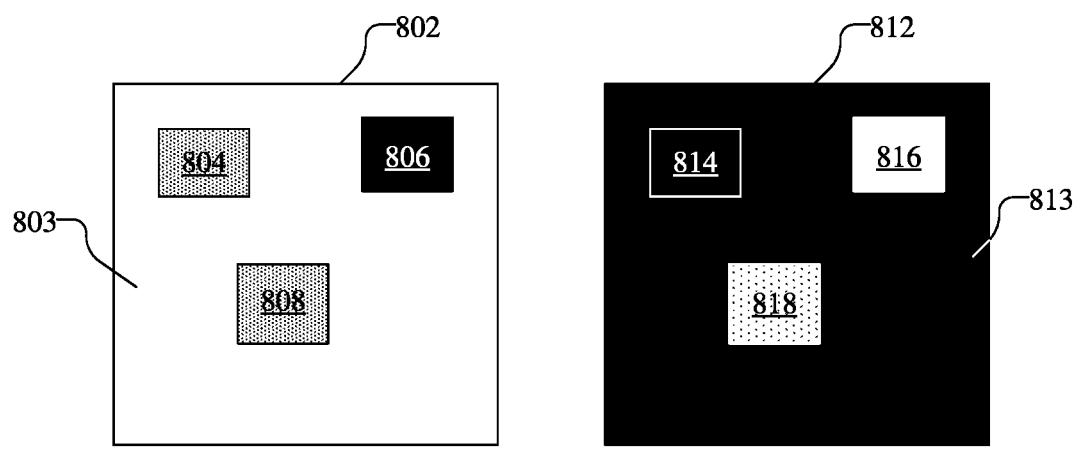
FIG. 8 illustrates an interference image received by a detector in the interference channel, and a polarization modification image showing received by a detector in the polarization modification channel.

FIG. 8 illustrates examples of the intensity of an interference image 802 for the sample 140, e.g., received by detector 154 in the interference channel 150, and a polarization modification image 812 for the sample 140, e.g., received by detector 124 in the polarization modification channel 120. A first area 804 of the interference image 802 corresponds to a first area 814 of the polarization modification image 812 and both of which are mapped to the same location on the sample 140. Similarly, areas 806 and 816 in the interference image 802 and polarization modification image 812 correspond to each other and the same location on the sample 140 and likewise, areas 808 and 818 in the interference image 802 and polarization modification image 812 correspond to each other and the same location on the sample 140. The areas 804, 806, and 808 in the interference image 802 represent areas with decreased intensity relative to the surrounding area 803 and areas 814, 816, and 818 in the polarization modification image 812 represent areas the same or increased intensity relative to the surrounding area 813. As illustrated by shading in FIG. 8, white indicates high intensity, i.e., the interference image 802 and polarization modification image 812 receive a large signal, and black indicates low or no intensity, i.e., the interference image 802 and polarization modification image 812 receive little or no signal. Use of the darkened shading in FIG. 8, e.g., in areas 804 and 808 in the interference image 802 relative to surrounding area 803, indicates that the intensity in areas 804 and 808 decreased by the same amounts, while the use of black shading in area 806 indicates that the intensity in area 806 decreased by a greater amount, i.e., the interference image 802 receives little or no signal in area 806. The cause of the decrease in intensity in areas 804, 806, and 808 may be due to changes in reflectivity of the sample 140 ($s_{pp}=s_{ss}<1$) and/or polarization modification of the light caused by the sample 140 ($s_{pp}\neq s_{ss}$ and/or $s_{ps}+s_{sp}\neq 0$). Without use of the polarization modification channel 120, producing the corresponding polarization modification image 812, the cause of the decrease in intensity in the areas 804, 806, and 808 in the interference image 802 is not known. The areas 814, 816, and 818 in the polarization modification image 812 correspond to areas 804, 806, and 808 in the interference image 802 and illustrate differences in the amount of polarization modification caused by the sample 140 using different levels of shading.

As illustrated in FIG. 8, the first areas 804, 814 in the interference image 802 and polarization modification image 812 represent an area of lower reflectivity on the sample 140 that does not modify the polarization of the sample illumination 135: $s_{pp}=s_{ss}<1$, $s_{ps}+s_{sp}=0$, where for convenience the reflectance of the bright surrounding area is taken to be $s_{pp}=s_{ss}=1$, $s_{ps}=s_{sp}=0$. The area 804 in the interference image 802 has a decreased intensity (represented by shading in FIG. 8) relative to the surrounding area 803 in the image 802 due to the lower reflectivity from the corresponding area on the sample 140 relative to other areas on the sample 140. Area 814 in the polarization modification image 812, however, does not receive a signal (as indicated by black shading), because the corresponding area on the sample 140 does not mix the polarization of the sample illumination 135. It should be understood that the black and white borders of the different areas in the interference image 802 and polarization modification image 812 merely indicate the locations of the areas in the figure and do not represent signal strength.

The second areas 806, 816 in the interference image 802 and polarization modification image 812 represent an area on the sample where there is no decreased amount of reflectivity on the sample 140, but there is complete polarization modification of the sample illumination 135: $s_{pp}=-s_{ss}\approx 1$, $s_{ps}+s_{sp}\neq 0$. Thus, as can be seen, the area 806 in the interference image 802 has a greatly reduced or zero intensity, i.e., the interference image 802 does not receive a signal (as indicated by black shading), and the area 816 in the polarization modification image 812 receives an increase in intensity (represented by white shading) due to the polarization modification of the sample illumination 135.

The third areas 808, 818 in the interference image 802 and polarization modification image 812 represent an area on the sample where there is a decreased amount of reflectivity on the sample 140 as well as an amount of polarization modification of the sample illumination 135: $s_{pp}\neq s_{ss}$, $s_{pp}+s_{ss}<1$, $s_{ps}+s_{sp}\neq 0$. As can be seen, the area 808 in the interference image 802 has a decreased intensity (represented by darkened shading), and the area 818 in the polarization modification image 812 receives a small increase in intensity, i.e., the polarization modification image 812 receives an increased signal (illustrated with lighter shading relative to the surrounding area 813) due to the polarization modification of the sample illumination 135. Accordingly, it can be determined that the decrease in intensity in area 808 is due to both a change of reflectivity on the sample 140 as well as polarization modification of the sample illumination 135 caused by the sample 140.

Accordingly, a comparison of the intensities in the corresponding area of the interference image 802 and the polarization modification image 812 enables a determination of whether the variation in intensity in the interference image 802 is due to a change in reflectivity, polarization modification, or both a change in reflectivity and polarization modification of the sample 140. Moreover, the polarization modification and reflectivity variations may be mapped to specific locations on the sample 140.

Further, as discussed above, the topography of the sample 140 may be determined using the data from interference channel 150. If desired, the determined topography may be compared to one or more reference surfaces, e.g., other samples, or other locations in the same sample 140, to determine if the topography is nominal or aberrant. A comparison of the topography characteristics, for example, subtracting the topography characteristics of a region of interest of the sample from the topography characteristics of the reference location on a pixel-by-pixel basis, removes common pattern structures or characteristics and leaves only variations. Resulting variations may be determined to be defects, e.g., using thresholding to identify candidate defects and filtering candidate defects based on one or more defect characteristics, such as height, size, shape, texture, etc. The topography of the sample 140 determined from the interference channel 150 may be used along with the polarization modification data from the polarization modification channel 120, e.g., to detect defects.

Accordingly, changes in a polarizing pattern on the sample 140 can be detected with the polarization modification channel 120 as a change in the polarization modification signal, even if the changes in a polarizing pattern do not appear as changes in reflectivity or topography in the interference channel 150. Further, defects on the sample 140 that obscure a pattern layout, or damage the pattern structure, may be detected by their effect on the polarization modification signal, signal intensity or topography. Hence, the polarization modification channel 120 not only enables polarization modification effects to be analyzed as part of the surface data (e.g., reducing sensitivity to polarization effects at the sample surface), but additionally provides information that can be used in detection and classification of defects that may not be identifiable based only on the intensity of the image in the interference channel or the measured sample topography.

Thus, the determined one or more physical characteristics of the sample 140, such as the presence of a defect, as discussed below, including the size, position, type, etc., may be determined by the computer system 170 and may be communicated and stored, e.g., in memory or in a database. The defect data may be communicated to adjust one or more process tools associated with particular fabrication process steps in the fabrication sequence (e.g., process tools responsible for the detected defects) or to adjust the fabrication sequence of the sample itself, e.g. by rejecting or discarding the sample or a portion of the sample.

For example, semiconductor process lines may use the defect data by associating an expected yield loss or kill rate with each of the defect types detected. The kill rates of defects typically combine using survival statistics to determine which die are likely to yield. In order to estimate yield impact from the reported defects on a given wafer, classifications may be assigned. In one implementation, the classification may be performed in an automated fashion using the features calculated for each defect. In another implementation, the wafer may be loaded onto another tool with a higher spatial resolution, and images are captured of each defect so that the defects may be classified, e.g., manually by operators. The defect data, which may include location and classification, may be used in a variety of ways. For example, the defect data may be used to adjust the fabrication sequence of the sample itself, e.g., by rejecting or discarding the sample or a portion of the sample, e.g., the entire wafer or a die from the wafer, based on the number, types, and locations of detected defects. For example, if a wafer exceeds a threshold for yield loss, the entire wafer may be scrapped, avoiding the consumption of downstream process tool resources.

Moreover, defect data may be used to adjust one or more process tools associated with particular fabrication process steps in the fabrication sequence (e.g., process tools responsible for the detected defects), including adjusting process parameters or removing process tools from the production line. For example, the defect data may be compared to defect data from wafers undergoing slightly different upstream processing, from which adjustments may be made to the process parameters of specific process tools to reduce defects. In one example, the slurry composition of a Chemical Mechanical Polishing (CMP) tool may be altered based on defect data. By comparing defect populations before and after a slurry change, the slurry composition that produces fewer defects can be identified and used. In this manner, the inline yield learning provided by the defect inspection tool provides rapid tuning of a process flow, e.g., during process development. Additionally, the defect data may be used to monitor the health of upstream process tools and to identify and take corrective action with respect to any tools responsible for defects. For example, with an understanding of the most likely root causes of each defect type at a given processing step, the health of upstream process tools may be monitored using the defect data. By way of example, this type of excursion monitoring may be performed using a statistical process control (SPC) system to flag a sample as out of specification due to one or more defect types. Based on the type of defects, the upstream process tools responsible for the excursions may be identified and appropriately addressed, e.g., by adjusting process parameters or by taking the process tools down for maintenance before further samples are affected. The defect data may also be used to optimize process tool preventative maintenance schedules.

If desired, other types of interferometers may be used to obtain the surface topography of a sample. For example, an interferometer may separate the combined sample and reference illuminations to be detected by multiple detectors, each with a single linear polarizing element, rather than using a phase mask. An alternative arrangement allowing simultaneous detection of the interference signal with multiple phase shifts is possible by separating the combined test and reference illuminations to multiple cameras, each with a different linear polarizer angle. Such an arrangement allows the maximum pixel density to be achieved, with pixels in the different paths sampling the same point on the sample, but with extra cost and the difficulty of maintaining alignment between the separated channels and avoiding modification the polarization states as the beam is separated. If the system is configured so that light incident on the sample and reference mirror is linearly polarized, then a circular polarizer may be used in this arrangement, which may be single circular polarizer placed before the combined beam is separated, or each path after separation of the combined beam may have its own circular polarizer.

Figure 9:
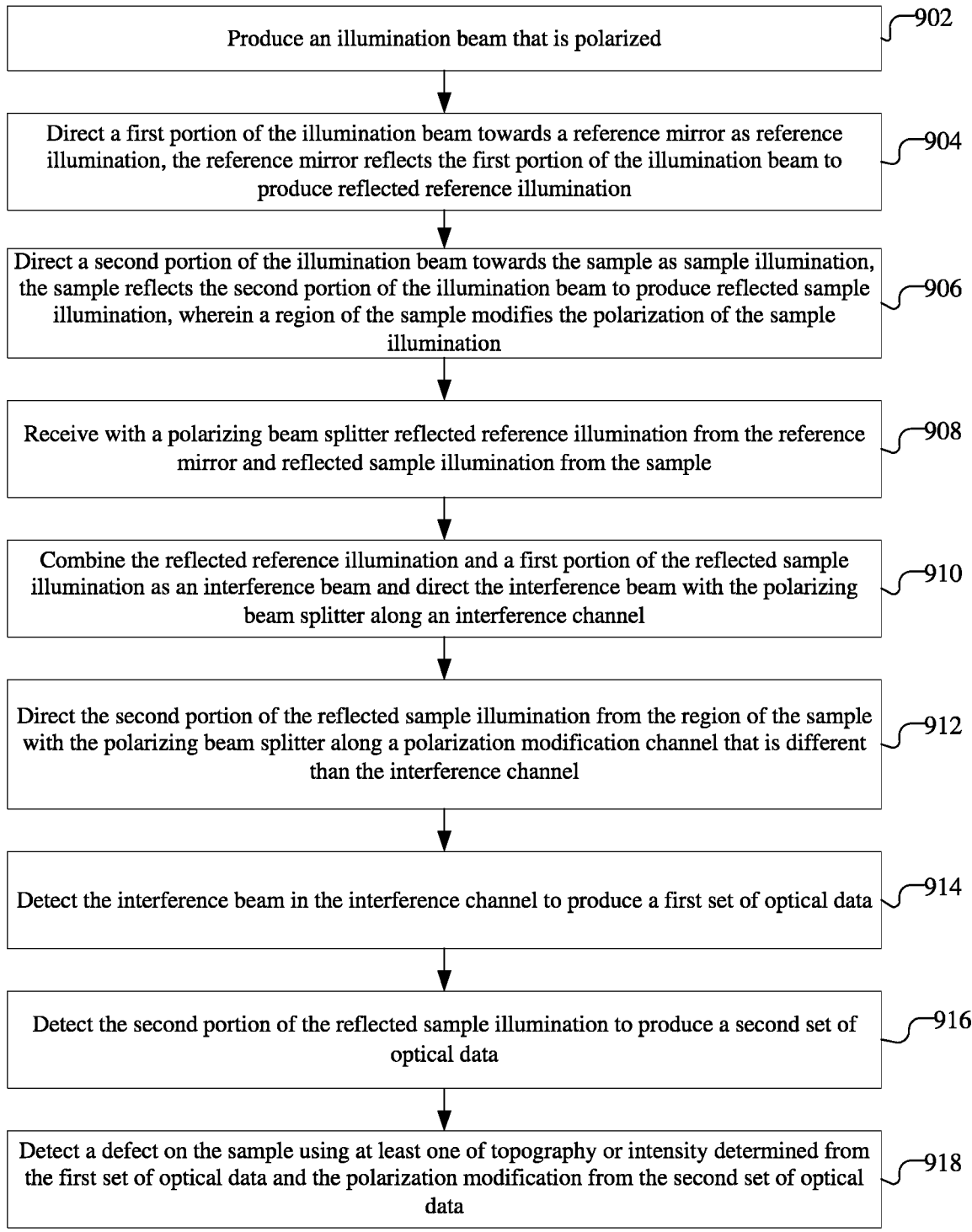
FIG. 9 is a flow chart illustrating a characteristic determination process using interference data and polarization mixing data.

FIG. 9 is a flow chart illustrating an example of a defect determination process 900 that may be performed by an optical inspection tool, such as such as interferometer 100. As illustrated in FIG. 9, an illumination beam that is polarized is produced (902), e.g., as illustrated with light source 110 and polarizer 119 in FIG. 1, 3, 4, or 5. A first portion of the illumination beam is directed towards a reference mirror as reference illumination, the reference mirror reflects the first portion of the illumination beam to produce reflected reference illumination (904), for example, as illustrated with polarizing beam splitter 132 in FIG. 1, 3, or 5 or with beam splitter 132M in FIG. 4. A second portion of the illumination beam is directed towards the sample as sample illumination, the sample reflects the second portion of the illumination beam to produce reflected sample illumination, wherein a region of the sample partially modifies the polarization of the sample illumination (906), for example, as illustrated with polarizing beam splitter 132 in FIG. 1, 3, or 5 or with beam splitter 132M in FIG. 4.

A polarizing beam splitter receives the reflected reference illumination from the reference mirror and the reflected sample illumination from the sample (908), for example, as illustrated with polarizing beam splitter 132 in FIGS. 1, 3, 4, and 5. The reflected reference illumination and a first portion of the reflected sample illumination are combined as an interference beam and the interference beam is directed by the polarizing beam splitter along an interference channel (910), for example, as illustrated with polarizing beam splitter 132 in FIGS. 1, 3, 4, and 5. A second portion of the reflected sample illumination from the region of the sample is directed with the polarizing beam splitter along a polarization modification channel that is different than the interference channel (912), for example, as illustrated with polarizing beam splitter 132 in FIGS. 1, 3, 4, and 5.

The interference beam is detected in the interference channel to produce a first set of optical data (914), for example, as illustrated with detectors 154, 554 in FIG. 1, 3, or 5. The second portion of the reflected sample illumination is detected in the polarization modification channel to produce a second set of optical data indicative of polarization modification of the sample illumination (916), for example, as illustrated with detector 124 in FIG. 1, 3, or 5. A defect on the sample is detected using at least one of topography or intensity determined from the first set of optical data and the polarization modification from the second set of optical data (918).

In one implementation, the first portion of the illumination beam is directed towards the reference mirror by the polarizing beam splitter and is linearly polarized with a first polarization orientation and the second portion of the illumination beam is directed towards the sample by the polarizing beam splitter and is linearly polarized with a second polarization orientation. For example, the reference illumination incident on the reference mirror may be linearly polarized and have the first polarization orientation, and the sample illumination incident on the sample may be linearly polarized and have the second polarization orientation that is orthogonal to the first polarization orientation. The first portion of the reflected sample illumination may have a first polarization orientation component that is aligned with the second polarization orientation, and the second portion of the reflected sample illumination may have a second polarization orientation that is aligned with the first polarization orientation and that is orthogonal to the first polarization orientation component of the first portion of the reflected sample illumination. In one implementation, the first portion of the illumination beam that is incident on the reference mirror may be circularly polarized with a first handedness, and the second portion of the illumination beam that is incident on the sample may be circularly polarized with a second handedness that is different than the first handedness. In one implementation, the reflected reference illumination received with the polarizing beam splitter is linearly polarized with the second polarization orientation and wherein the first portion of the reflected sample illumination is linearly polarized with a direction aligned with the first polarization orientation, and the second portion of the reflected sample illumination is linearly polarized with a direction aligned with the second polarization orientation. For example, the sample illumination and the reflected sample illumination may pass through a first quarter-wave plate, the reference illumination and the reflected reference illumination may pass through a second quarter-wave plate.

In one implementation, the interference beam may pass through a quarter-wave plate.

In one implementation, polarization modification at the region of the sample may be detected using a change of intensity of the interference beam from the first set of optical data and the polarization modification from the second set of optical data. In one implementation, for example, the region of the sample is a first region and wherein a second region of the sample partially modifies the polarization of the sample illumination by a different amount than the first region of the sample, and the process may further comprise detecting polarization modification at the second region of the sample using a change of intensity of the interference beam in the second region from the first set of optical data and the polarization modification in the second region from the second set of optical data.

In one implementation, lower reflectivity at the region of the sample may be detected using the first set of optical data and the second set of optical data. For example, the lower reflectivity at the region of the sample may be detected using a decrease of intensity of the interference beam from the first set of optical data and polarization modification from the second set of optical data.

In one implementation, the first data set may be a first image of the sample produced from the interference beam and the second data set may be a second image of the sample produced from the second portion of the sample reflection illumination.

The process may further include directing the illumination beam with a second beam splitter towards the polarizing beam splitter, for example, as illustrated with beam splitter 118 illustrated in FIGS. 3 and 5. The second portion of the reflected sample illumination may be received with the second beam splitter from the polarizing beam splitter and directed along the polarization modification channel, for example, as illustrated with beam splitter 118 illustrated in FIGS. 3 and 5.

In one implementation, the first portion of the illumination beam may be directed towards the reference mirror as the reference illumination and the second portion of the illumination beam may be directed towards the sample as the sample illumination by the polarizing beam splitter that is part of an interference objective, for example, as illustrated by polarizing beam splitter 132 illustrated in FIGS. 1, 3, and 5. For example, the interference objective may be one of a Linnik objective or Michelson objective.

In one implementation, the first portion of the illumination beam may be directed towards the reference mirror as the reference illumination and the second portion of the illumination beam may be directed towards the sample as the sample illumination by a second beam splitter that is part of an interference objective, for example, as illustrated by beam splitter 132M illustrated in FIG. 4. For example, the interference objective may be a Mirau objective, wherein the reference mirror is positioned on a pupil of the interference objective through which the illumination beam, the reflected reference illumination and the reflected sample illumination pass, for example, as illustrated by pupil 134M and reference mirror 138M illustrated in FIG. 4. The illumination beam and the reflected reference illumination and the reflected sample illumination may pass through a quarter-wave plate positioned between the polarizing beam splitter and the pupil, for example, as illustrated by circular polarizer 131 in FIG. 4.

Figure 10:
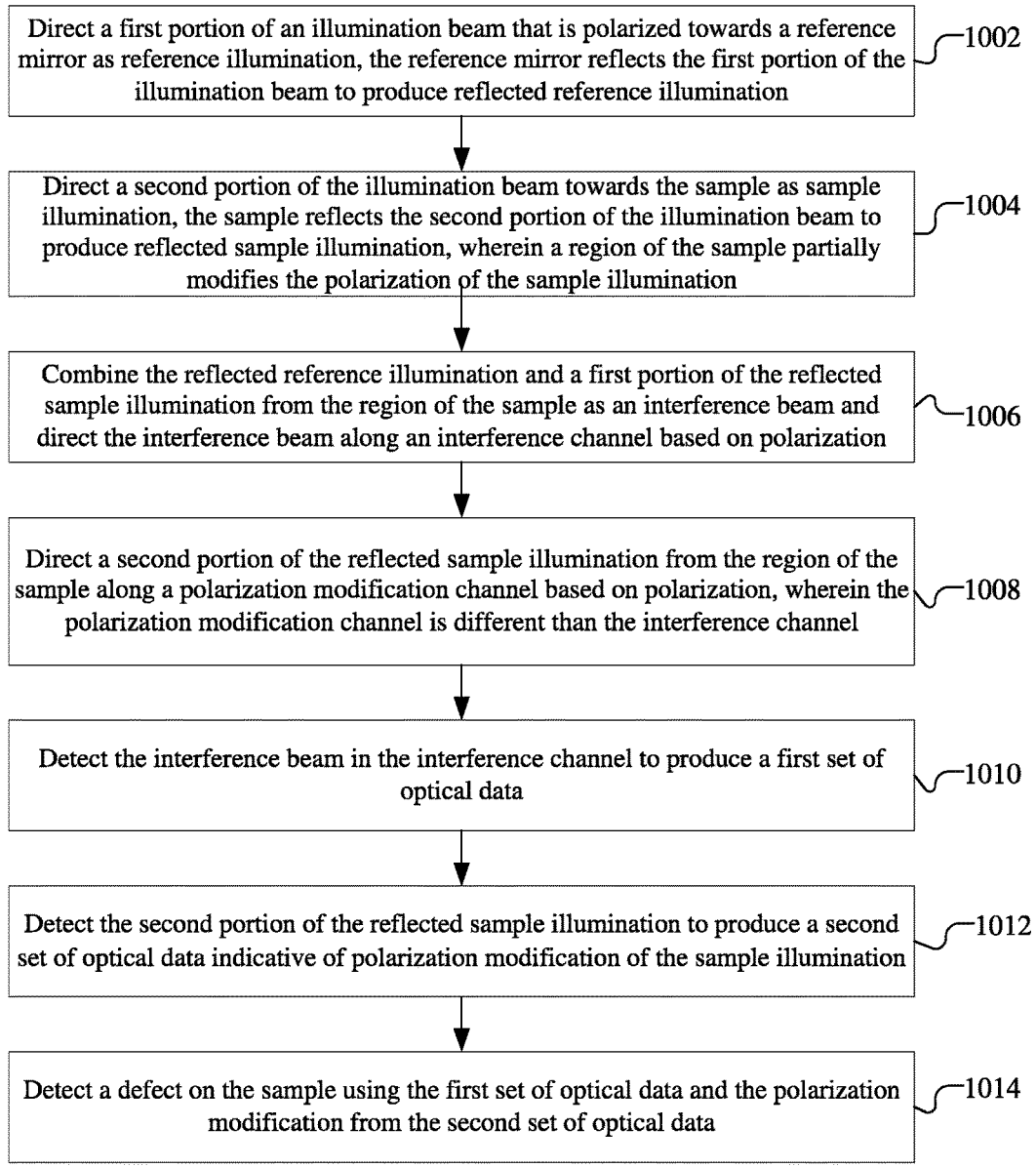
FIG. 10 is a flow chart illustrating a defect determination process that may be performed by an optical inspection tool.

FIG. 10 is a flow chart illustrating an example of a defect determination process 1000 that may be performed by an optical inspection tool, such as such as interferometer 100. As illustrated in FIG. 10, at block 1002, a first portion of an illumination beam that is polarized is directed towards a reference mirror as reference illumination, the reference mirror reflects the first portion of the illumination beam to produce reflected reference illumination. Additionally, at block 1004, a second portion of the illumination beam is directed towards the sample as sample illumination, the sample reflects the second portion of the illumination beam to produce reflected sample illumination, wherein a region of the sample partially modifies the polarization of the sample illumination. For example, the reference illumination incident on the reference mirror may be linearly polarized and have a first polarization orientation, and the sample illumination incident on the sample may be linearly polarized and have a second polarization orientation that is orthogonal to the first polarization orientation. In another example, the first portion of the illumination beam that is incident on the reference mirror may be circularly polarized with a first handedness, and the second portion of the illumination beam that is incident on the sample may be circularly polarized with a second handedness that is different than the first handedness. A means for directing a first portion of an illumination beam that is polarized towards a reference mirror as reference illumination, the reference mirror reflects the first portion of the illumination beam to produce reflected reference illumination, for example, may include the polarizing beam splitter 132 or beam splitter 132M, and quarter wave plate 131 as shown in FIG. 1, 3, 4, or 5. A means for directing a second portion of the illumination beam towards the sample as sample illumination, the sample reflects the second portion of the illumination beam to produce reflected sample illumination, wherein a region of the sample partially modifies the polarization of the sample illumination, for example, may include the polarizing beam splitter 132 or beam splitter 132M, and quarter wave plates 131 or 133 as shown in FIG. 1, 3, 4, or 5.

At block 1006, the reflected reference illumination and a first portion of the reflected sample illumination from the region of the sample are combined as an interference beam, which is directed along an interference channel, based on polarization. Additionally, at block 1008, a second portion of the reflected sample illumination from the region of the sample is directed along a polarization modification channel based on polarization, wherein the polarization modification channel is different than the interference channel. A means for combining the reflected reference illumination and a first portion of the reflected sample illumination from the region of the sample as an interference beam and directing the interference beam along an interference channel based on polarization; for example, may include the polarizing beam splitter 132, beam splitter 132M, quarter wave plates 131, 133 shown in FIG. 1, 3, 4, or 5. A means for directing a second portion of the reflected sample illumination from the region of the sample along a polarization modification channel based on polarization, wherein the polarization modification channel is different than the interference channel for example, may include the polarizing beam splitter 132, beam splitter 132M, and quarter wave plate 131 shown in FIG. 1, 3, 4, or 5.

At block 1010, the interference beam in the interference channel is detected to produce a first set of optical data. For example, the first set of optical data may be an image of the sample produced from the interference beam. Additionally, at block 1012, the second portion of the reflected sample illumination is detected in the polarization modification channel to produce a second set of optical data indicative of polarization modification of the sample illumination. For example, the second set of optical data may be a second image of the sample produced from the second portion of the reflected sample illumination. A means for detecting the interference beam in the interference channel to produce a first set of optical data, for example, may include detectors 154, 554 and quarter wave plate 153 shown in FIG. 1, 3, or 5. A means for detecting the second portion of the reflected sample illumination in the polarization modification channel to produce a second set of optical data indicative of polarization modification of the sample illumination, for example, may include detector 124 and linear polarizer 119 in FIG. 1, 3, or 5.

At block 1014, a defect on the sample is detected using the first set of optical data and the polarization modification from the second set of optical data. A means for detecting a defect on the sample using the first set of optical data and the polarization modification from the second set of optical data, for example, may include the one or more processors 172 with dedicated hardware or implementing executable code or software instructions in memory 174 or non-transitory computer-usable storage medium 179. In some implementations, polarization modification at the region of the sample may additionally be detected using a change of intensity of the interference beam from the first set of optical data and the polarization modification from the second set of optical data. For example, the region of the sample may be a first region and a second region of the sample may partially modify the polarization of the sample illumination by a different amount than the first region of the sample. The polarization modification may be detected at the second region of the sample using a change of intensity of the interference beam in the second region from the first set of optical data and the polarization modification in the second region from the second set of optical data. A means for detecting polarization modification at the region of the sample using a change of intensity of the interference beam from the first set of optical data and the polarization modification from the second set of optical data, for example, may include the one or more processors 172 with dedicated hardware or implementing executable code or software instructions in memory 174 or non-transitory computer-usable storage medium 179. In some implementations, lower reflectivity at the region of the sample may additionally be detected using the first set of optical data and the second set of optical data. A means for detecting lower reflectivity at the region of the sample using the first set of optical data and the second set of optical data, for example, may include the one or more processors 172 with dedicated hardware or implementing executable code or software instructions in memory 174 or non-transitory computer-usable storage medium 179.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An apparatus configured to measure reflectively change by a sample, the apparatus comprising:
    an interference objective comprising a polarizing beam splitter that is configured to receive an illumination beam that is polarized and direct a first portion of the illumination beam towards a reference mirror as reference illumination and is configured to direct a second portion of the illumination beam towards the sample as sample illumination, wherein the reference mirror is configured to reflect the first portion of the illumination beam to produce reflected reference illumination, the polarizing beam splitter is further configured to receive the reflected reference illumination from the reference mirror and reflected sample illumination from the sample, the polarizing beam splitter is configured to combine the reflected reference illumination and a first portion of the reflected sample illumination as an interference beam that is directed along an interference channel, and a second portion of the reflected sample illumination is directed along a polarization modification channel that is different than the interference channel;
    a first detector in the interference channel configured to receive the interference beam and produce a first set of optical data from the sample;
    a second detector in the polarization modification channel configured to receive the second portion of the reflected sample illumination and produce a second set of optical data indicative of polarization modification of the sample illumination; and
    at least one processor coupled to the first detector and the second detector and configured to detect the reflectivity change by the sample using the first set of optical data and the polarization modification from the second set of optical data.

2. The apparatus of claim 1, wherein the interference objective is one of a Linnik objective or Michelson objective.

3. The apparatus of claim 1, further comprising:
    a first quarter-wave plate between the polarizing beam splitter and the reference mirror; and
    a second quarter-wave plate between the polarizing beam splitter and the sample.

4. The apparatus of claim 1, further comprising a quarter-wave plate between the polarizing beam splitter and the first detector.

5. The apparatus of claim 1, wherein the at least one processor is further configured to detect polarization modification at a region of the sample using a change of intensity of the interference beam from the first set of optical data and the polarization modification from the second set of optical data.

6. The apparatus of claim 5, wherein the region of the sample is a first region and wherein a second region of the sample modifies the polarization of the sample illumination by a different amount than the first region of the sample, wherein the at least one processor is further configured to detect polarization modification at the second region of the sample using a change of intensity of the interference beam in the second region from the first set of optical data and the polarization modification in the second region from the second set of optical data.

7. The apparatus of claim 1, wherein the at least one processor is further configured to detect a lower reflectivity at a region of the sample using the first set of optical data and the second set of optical data.

8. The apparatus of claim 7, wherein the at least one processor is configured to detect the lower reflectivity at the region of the sample using a decrease of intensity of the interference beam from the first set of optical data and the polarization modification from the second set of optical data.

9. The apparatus of claim 1, wherein the first detector receives a first image of the sample from the interference beam and the second detector receives a second image of the sample from the second portion of the sample illumination.

10. The apparatus of claim 1, further comprising:
    a second beam splitter that directs the illumination beam towards the interference objective, and directs the second portion of the reflected sample illumination along the polarization modification channel comprising the second detector.

11. The apparatus of claim 1, wherein the at least one processor is further configured to detect a defect on the sample using the reflectivity change.

12. A method of measuring reflectivity change by a sample, the method comprising:
- directing a first portion of an illumination beam that is polarized towards a reference mirror as reference illumination, the reference mirror reflects the first portion of the illumination beam to produce reflected reference illumination;
- directing a second portion of the illumination beam towards the sample as sample illumination, the sample reflects and modifies polarization of the second portion of the illumination beam to produce reflected sample illumination;
- combining the reflected reference illumination and a first portion of the reflected sample illumination from the sample as an interference beam and directing the interference beam along an interference channel based on polarization;
- directing a second portion of the reflected sample illumination from the sample along a polarization modification channel based on polarization, wherein the polarization modification channel is different than the interference channel;
- detecting the interference beam in the interference channel to produce a first set of optical data;
- detecting the second portion of the reflected sample illumination in the polarization modification channel to produce a second set of optical data indicative of polarization modification of the sample illumination; and
- detecting a reflectivity change by the sample using the first set of optical data and the polarization modification from the second set of optical data.

13. The method of claim 12, wherein the reference illumination incident on the reference mirror is linearly polarized and has a first polarization orientation, and the sample illumination incident on the sample is linearly polarized and has a second polarization orientation that is orthogonal to the first polarization orientation.

14. The method of claim 12, wherein the first portion of the illumination beam that is incident on the reference mirror is circularly polarized with a first handedness, and the second portion of the illumination beam that is incident on the sample is circularly polarized with a second handedness that is different than the first handedness.

15. The method of claim 12, further comprising detecting polarization modification at a region of the sample using a change of intensity of the interference beam from the first set of optical data and the polarization modification from the second set of optical data.

16. The method of claim 15, wherein the region of the sample is a first region and wherein a second region of the sample modifies the polarization of the sample illumination by a different amount than the first region of the sample, the method further comprising detecting polarization modification at the second region of the sample using a change of intensity of the interference beam in the second region from the first set of optical data and the polarization modification in the second region from the second set of optical data.

17. The method of claim 12, further comprising detecting lower reflectivity at a region of the sample using the first set of optical data and the second set of optical data.

18. The method of claim 17, wherein detecting the lower reflectivity at the region of the sample comprises using a decrease of intensity of the interference beam from the first set of optical data and the polarization modification from the second set of optical data.

19. The method of claim 12, wherein the first set of optical data comprises a first image of the sample produced from the interference beam and the second set of optical data comprises a second image of the sample produced from the second portion of the reflected sample illumination.

20. The method of claim 12, further comprising detecting a defect on the sample using the reflectivity change.

21. An apparatus configured to measure reflectivity change by a sample, the apparatus comprising:
- means for directing a first portion of an illumination beam that is polarized towards a reference mirror as reference illumination, the reference mirror reflects the first portion of the illumination beam to produce reflected reference illumination and directing a second portion of the illumination beam towards the sample as sample illumination, wherein the sample will reflect and modify polarization of the second portion of the illumination beam to produce reflected sample illumination;
- means for combining the reflected reference illumination and a first portion of the reflected sample illumination as an interference beam and directing the interference beam along an interference channel;
- means for directing a second portion of the reflected sample illumination along a polarization modification channel, wherein the polarization modification channel is different than the interference channel;
- means for detecting the interference beam in the interference channel to produce a first set of optical data;
- means for detecting the second portion of the reflected sample illumination in the polarization modification channel to produce a second set of optical data indicative of polarization modification of the sample illumination; and
- means for detecting a reflectivity change by the sample using the first set of optical data and the polarization modification from the second set of optical data.

22. The apparatus of claim 21, further comprising a means for producing circular polarization with a first handedness of the first portion of the illumination beam that is incident on the reference mirror and producing circular polarization with a second handedness of the second portion of the illumination beam that is incident on the sample, the second handedness is different than the first handedness.

23. The apparatus of claim 21, further comprising means for detecting a defect on the sample using the reflectivity change.

* * * * *